(12) United States Patent
Park et al.

(10) Patent No.: US 11,621,862 B1
(45) Date of Patent: Apr. 4, 2023

(54) METHOD OF PROVIDING CUSTOMIZED UX/UI FOR EACH USER TYPE DURING RUNTIME OF WEB APPLICATION BY USING ROOM TEMPLATE, AND SYSTEM USING THE SAME

(71) Applicant: pplink, Inc., Seoul (KR)

(72) Inventors: Ju Rung Park, Seoul (KR); Tae Min Kim, Seoul (KR)

(73) Assignee: pplink, Inc.

( * ) Notice: Subject to any disclaimer, the term of this patent is extended or adjusted under 35 U.S.C. 154(b) by 0 days.

(21) Appl. No.: 17/880,041

(22) Filed: Aug. 3, 2022

(30) Foreign Application Priority Data

Sep. 13, 2021 (KR) ........................ 10-2021-0121808

(51) Int. Cl.
- *H04L 12/18* (2006.01)
- *H04L 9/32* (2006.01)
- *G06F 9/451* (2018.01)

(52) U.S. Cl.
CPC .......... *H04L 12/1822* (2013.01); *G06F 9/451* (2018.02); *H04L 9/3213* (2013.01)

(58) Field of Classification Search
CPC .... H04L 12/1822; H04L 9/3213; G06F 9/451
See application file for complete search history.

(56) References Cited

U.S. PATENT DOCUMENTS

| | | | | |
|---|---|---|---|---|
| 7,072,940 B1* | 7/2006 | Day | ...................... | G06Q 10/10 707/999.102 |
| 9,621,252 B2* | 4/2017 | Sarda | ................. | G06Q 20/3278 |
| 10,587,413 B1* | 3/2020 | Todd | ......................... | H04L 9/50 |
| 2002/0140732 A1* | 10/2002 | Tveskov | ................ | G09B 19/04 715/763 |
| 2016/0170390 A1* | 6/2016 | Xie | ..................... | H04L 12/2829 700/19 |

(Continued)

FOREIGN PATENT DOCUMENTS

| | | |
|---|---|---|
| KR | 2013-0086149 A | 7/2013 |
| KR | 10-2076576 B1 | 2/2020 |
| KR | 10-2260738 B1 | 6/2021 |

OTHER PUBLICATIONS

Office Action issued by Korean Intellectual Property Office in priority application KR 10-2021-0121808, dated Mar. 26, 2022, pp. 1-7.

(Continued)

*Primary Examiner* — John A Follansbee
*Assistant Examiner* — Raqiul A Choudhury
(74) *Attorney, Agent, or Firm* — Dinsmore & Shohl LLP; Yongsok Choi

(57) ABSTRACT

Provided is a method of providing a user-customized user experience (UX)/user interface (UI) during a runtime of a web application by using a room template, the method including: transmitting, from a user device to a service server, a room entrance-related access request; requesting, by the service server, an application programming interface (API) server to generate an access token including room template information; transmitting the access token generated by the API server to the user device via the service server; transmitting, by the user device, the access token to the API server; and providing, by the API server, a UX/UI to the user device based on the room template information.

6 Claims, 7 Drawing Sheets

(56) References Cited

U.S. PATENT DOCUMENTS

2016/0307165 A1\* 10/2016 Grødum ................. G07C 9/21
2021/0344671 A1\* 11/2021 Chiang ............... H04L 12/1827
2023/0008698 A1\* 1/2023 McNamara ........... H04W 4/021

OTHER PUBLICATIONS

Office Action issued by Korean Intellectual Property Office in priority application KR 10-2021-0121808, dated Mar. 26, 2022, pp. 1-8.

\* cited by examiner

FIG. 2
-  -> SET TO BE HIDDEN FROM OTHER PARTICIPANTS
-  -> SET LANGUAGE TO JAPANESE
-  -> SET AUTHORITY TO ENTER IMMEDIATELY WITHOUT STANDING BY
-  -> SET NOT TO USE CAMERA
-  : -> ASSIGN AUTHORITY OF LEVEL 2

FIG. 4

- student
  - Layout
    - LAYOUT IN FORMAT SUITABLE TO STUDENT
  - Options
    -  : STUDENT DOES NOT USE CAMERA
- teacher
  - Layout
    - LAYOUT SUITABLE TO TEACHER
  - Options
    -  : HAS AUTHORITY OF LEVEL 2, AND THUS IS ABLE TO CONTROL MICROPHONE, CANVAS MANIPULATION AUTHORITY, OR LIKE OF STUDENT
- observer
  - Layout
    - LAYOUT SUITABLE TO OBSERVER
  - Options
    -  : OBSERVER IS HIDDEN FROM OTHER PARTICIPANTS (OBSERVES SECRETLY)

METHOD OF PROVIDING CUSTOMIZED UX/UI FOR EACH USER TYPE DURING RUNTIME OF WEB APPLICATION BY USING ROOM TEMPLATE, AND SYSTEM USING THE SAME

CROSS-REFERENCE TO RELATED APPLICATION

This application claims the benefit of Korean Patent Application No. 10-2021-0121808, filed on Sep. 13, 2021, in the Korean Intellectual Property Office, the disclosure of which is incorporated herein in its entirety by reference.

BACKGROUND

1. Field

The disclosure relates to a method of providing a user experience (UX)/user interface (UI) for each user type during a runtime of a web application by using a room template, and a system using the same. More particularly, the disclosure relates to a method and system for providing a user-customized layout during a runtime of an application programming interface (API)-based web application such that a company directly operating a service may generate, configure, and dynamically modify a UX/UI optimized according to a role type of a user.

2. Description of the Related Art

With the development of Internet and communication technology and the spread of non-face-to-face culture, applications related to remote communication, such as video calls, video conferences, online conferences, electronic conferences, and collaboration systems, participated by a plurality of user terminals, are being gradually variously used.

Here, various functions provided to users, such as video conference solutions, video education solutions, and web seminars or webinars, in addition to development and operation of operating company-related servers that directly operate business to provide services to customers, may be provided, via external application programming interface (API) servers, in forms of web application provided to separate development companies or API providing companies.

At this time, required user interface (UI)/user experience (UX) environments of applications may vary depending on a purpose of use of each user and a role type of each user, and a purpose of use or role of a user varies according to user types or situations whereas built-in source technology is similar. Accordingly, when a screen layout and a user's authority, attribute, and the like need to be provided differently according to a purpose of use, a new program needs to be generated every time.

Particularly, in remote communication software, such as video conference solutions and video education solutions, it is preferable to provide a customized UX/UI according to types of users and natures of services, because required functions and authorities are different depending on a role of each user, and thus a new method of providing a customized UX/UI for each user type, and a system using the same are required.

SUMMARY

Provided are a method and system for dynamically providing a room template during a runtime of a web application for a service providing company to provide and manage operation methods and layouts optimized to role types of users participating in a room.

Also, provided is a user experience (UX)/user interface (UI) optimized to a role type of each user by defining a room template related to an option and a layout of a room space where users communicate with each other, according to a room environment and a role type of a user.

Also, provided is a UX/UI corresponding to a role of each user and a nature of a room in which users participate, in a remote communication environment, thereby enhancing immersiveness and functionality through provision of an environment customized to a type of each user.

Also, provided is a room template management console enabling a service providing company or user to conveniently generate, modify, add, or update a room template in an easy way to correct, thereby enhancing convenience of a user and administrator.

Also, provided is a UX/UI by parsing layout and option information data from a web application during a runtime, thereby increasing a range of UX/UI modification according to a role type of a user in one application.

Also, provided are a method and system for dynamically modifying a room template, wherein a layout, an option, and the like may be dynamically modified even while an application is being used.

Additional aspects will be set forth in part in the description which follows and, in part, will be apparent from the description, or may be learned by practice of the presented embodiments.

According to an embodiment of the disclosure, a method of providing a user-customized user experience (UX)/user interface (UI) during a runtime of a web application by using a room template, includes transmitting, from a user device to a service server, a room entrance-related access request, requesting, by the service server, an application programming interface (API) server to generate an access token including room template information, transmitting the access token generated by the API server to the user device via the service server, transmitting, by the user device, the access token to the API server, and providing, by the API server, a UX/UI to the user device based on the room template information.

The room template information may include layout information and option information, the layout information and option information may be determined according to a role type of a user of the user device, and the option information may include information related to authority, an attribute, a function, and a language of the user. The role type of the user may include a student, a teacher, and an observer. The user device may be configured to parse the room template information received from the API server during the runtime.

The room template information may be modifiable by an administrator related to the service server by using a management console provided through the API server. The transmitting of the room entrance-related access request may include transmitting, to the service server, the role type of the user and information about the room to enter, and the room template information may correspond to the role type of the user of the user device. The method may further include, when entrance to the room is selected by the user device, providing a plurality of role types pre-designated according to the room, and receiving selection on one of the plurality of role types from the user device.

According to another embodiment of the disclosure, a system for providing a user-customized user experience (UX)/user interface (UI) during a runtime of a web application by using a room template, includes a user device configured to transmit, to a service server, a room entrance-related access request, and an application programming interface (API) server configured to receive, from the service server, a request to generate an access token including room template information, and transmit the generated access token to the user device through the service server, wherein the API server is further configured to provide a UX/UI to the user device based on the room template information in response to receiving the access token from the user device.

The room template information may include layout information and option information, the layout information and option information may be determined according to a role type of a user of the user device, and the option information may include information related to authority, an attribute, a function, and a language of the user. The role type of the user may include a student, a teacher, and an observer. The user device may be configured to parse the room template information received from the API server during the runtime.

The room template information may be modifiable by an administrator related to the service server by using a management console provided through the API server. During the room entrance-related access request, the role type of the user and information about a room to enter are transmitted to the service server, and the room template information corresponds to the role type of the user of the user device. When entrance to the room is selected by the user device, a plurality of role types pre-designated according to the room may be provided and selection on one of the plurality of role types may be received from the user device.

BRIEF DESCRIPTION OF THE DRAWINGS

These and/or other aspects will become apparent and more readily appreciated from the following description of the embodiments, taken in conjunction with the accompanying drawings in which:

FIG. 2 illustrates an example of various pieces of option information of a room template, according to an embodiment of the disclosure;

FIG. 4 illustrates an example for describing a room template provided according to a role type of each user, in a video class environment, according to an embodiment of the disclosure.

DETAILED DESCRIPTION

Hereinafter, the disclosure will be described in detail with reference to the accompanying drawings such that one of ordinary skill in the art may easily implement the disclosure. However, the disclosure may be implemented in various different forms and is not limited to embodiments described herein.

Terms used herein are intended to describe embodiments and are not intended to limit the disclosure. In the present specification, an expression used in the singular encompasses an expression in the plural, unless it has a clearly different meaning in the context.

Terms such as "comprises" and "comprising" used in the present specification are not intended to preclude the possibility that one or more other components, steps, operations, and/or devices may exist or may be added.

While terms including ordinal numbers, such as "first", "second", etc., may be used to describe various components, such components must not be limited to the above terms. The above terms are used only to distinguish one component from another. In the description of the disclosure, certain detailed explanations of related art are omitted when it is deemed that they may unnecessarily obscure the essence of the disclosure.

Further, components shown in embodiments of the disclosure are independently illustrated to represent different characteristic functions, and it does not mean that the components are formed in units of separate pieces of hardware or single piece of software. In other words, for convenience of descriptions, the components are enumerated to be described, wherein at least two components may be combined to configure one component or one component may be divided into a plurality of components to perform functions. An integrated embodiment and separated embodiments of each component are also included in the scope of the disclosure unless deviated from the essence of the disclosure.

Hereinafter, embodiments of the disclosure will be described in detail with reference to accompanying drawings. Configurations of the disclosure and functional effects thereof will be clearly understood through the following detailed description.

Figure 1:
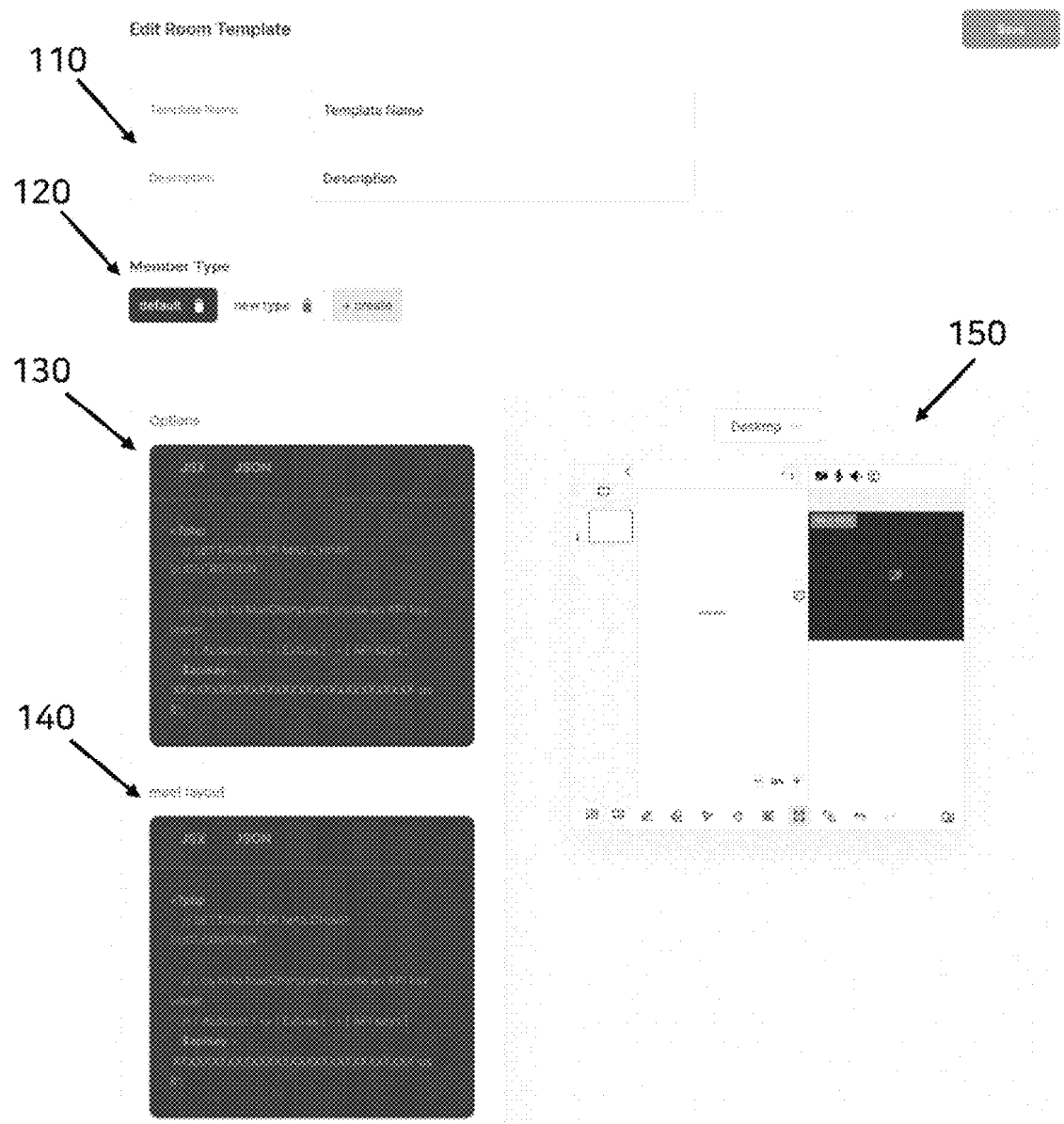
FIG. 1 illustrates an example of a screen defining a room template through a room template management console, according to an embodiment of the disclosure.

FIG. 1 illustrates an example of a screen defining a room template through a room template management console, according to an embodiment of the disclosure.

The room template according to the disclosure may be defined as a set of a plurality of roles according to roles or types of users, and FIG. 1 illustrates a screen in which a room template administrator defines a specific role type of a specific room template through the room template management console accessible through an application programming interface (API) server.

Referring to FIG. 1, the room template administrator or a user may input room basic information 110 including a name and descriptions of the room template, select or designate a user role type 120 (member type), and generate and add a required role type when necessary.

When the user role type 120 of the room template is designated, a screen for defining and editing option information 130 and layout information 140 for a corresponding role type is provided. Here, the option information 130 is configured to include information related to at least one of authority, an attribute, a function, and a language of a user of the corresponding role type, and the layout information 140 is configured to include information related to arrangements, colors, attributes, and sizes of user interface (UI) components displayed on a user screen of the corresponding role type.

A preview 150 for identifying in advance a user experience (UX)/UI provided to a user may also be displayed.

According to the disclosure, options and layouts of a room provided through a web application are not pre-determined, but logics related to options and layouts configuring a room template corresponding to the room may be provided to the user or administrator, the user or administrator may be able to freely edit and modify configurations of specific options and layouts according to each user role by using a management console, and developers may provide an editor in a form of management console for easy modification.

For example, examples of components configuring a layout may include a mute function, a shared whiteboard, a whiteboard toolbar (a pen, an eraser, and a highlight), a chatting function, a memo, a network stability display portion, an emoticon, a counterpart video display portion, a self-video display portion, a guide message display portion, a timer, a title display portion, and a watermark function for preventing data leakage. Also, attributes of such components may be location-related information about where the components are arranged on a screen, design-related information, such as colors and sizes, an arrangement order of a camera, a microphone, a speaker, screen sharing, and the like, and presence of function display, but are not limited thereto.

Referring to a screen of FIG. 2 for defining and editing the option information 130 and layout information 140, an edit screen enabling web developers to define and edit in JavaScript extensible mark-up language (XML) (JSX) grammar similar to HTML may be provided to define options and layouts of a web application for easy modification and management. Room template information including the option information 130 and layout information 140 may be converted into a form of JavaScript object notation (JSON) grammar, stored in a database (DB) of the API server managed by a web application development company, and transmitted to a client device.

Also, according to the disclosure, layout and option information data may be parsed from the DB stored in the API server during a runtime of an application, rendered, and applied so as to provide an optimized UX/UI to the user according to a role type. A general application has UX/UI information, such as an application program format, authority, or function, pre-determined during compiling and building operations, but according to the disclosure, UX/UI information, such as a program format, authority, or function, is determined during a runtime of an application, instead of a building operation. Accordingly, a range of UX/UI modification may be increased according to a role type of each user in one application, depending on needs of the administrator or user, and in addition, the UX/UI may be dynamically modified even while the application is used.

Also, in the present embodiment, a software program is described as a web application, but the software program is not limited thereto and may be applied to various types of application programs.

FIG. 2 illustrates an example of various pieces of option information of a room template, according to an embodiment of the disclosure.

The room template may be defined as a set of a plurality of roles according to roles or types of users, and at this time, each role may be defined by a combination of a corresponding layout and a corresponding option.

Referring to FIG. 2, options of the room template are configured to define an attribute, a language, authority, and a function of a user, and for example, may be configured to set openness to another participant, set a type of a provided language, set authority related to whether entrance is possible, set whether a camera is available or supportable, or assign a level or control authority related to function restriction or forced exit of another participant.

Such options of the room template may be defined to be optimized according to a nature of a room and a role type of the user, and may be modified and edited by an administrator by using a room template management console.

FIGS. 3A through 3E illustrate examples of various types of layouts of a room template, according to an embodiment of the disclosure.

Figure 3A:
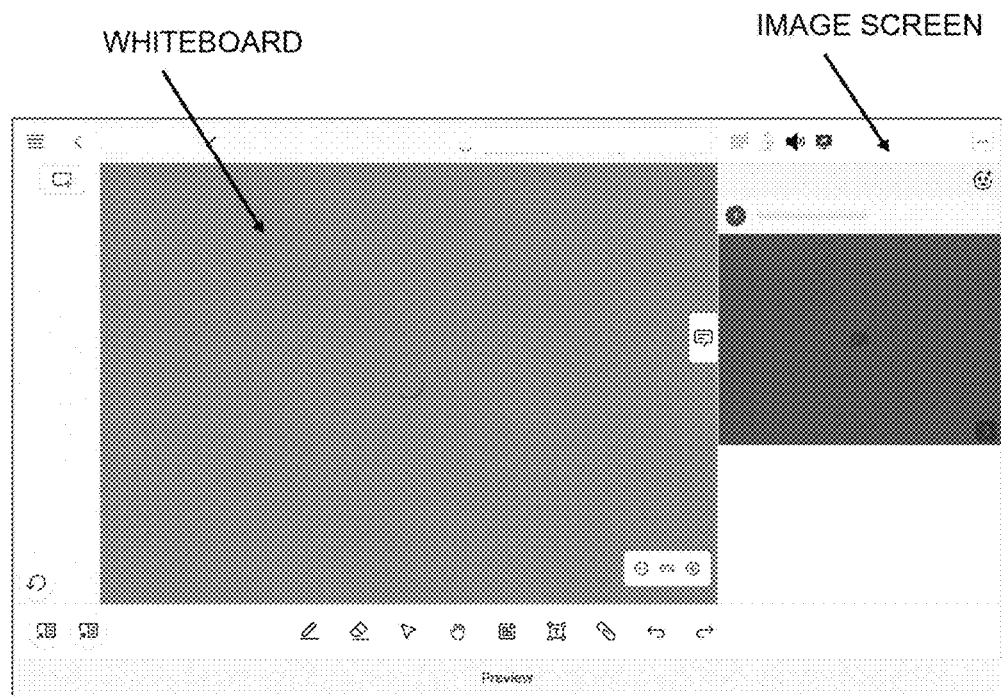
FIGS. 3A 3B, 3C, 3D, 3E illustrate examples of various types of layouts of a room template, according to an embodiment of the disclosure.

Referring to FIG. 3A, a layout including, at a left side, a whiteboard tool bar including a pen, an eraser, a highlight, and a text input, and, at a right side, an image screen indicating a communicating screen, may be displayed.

Figure 3B:
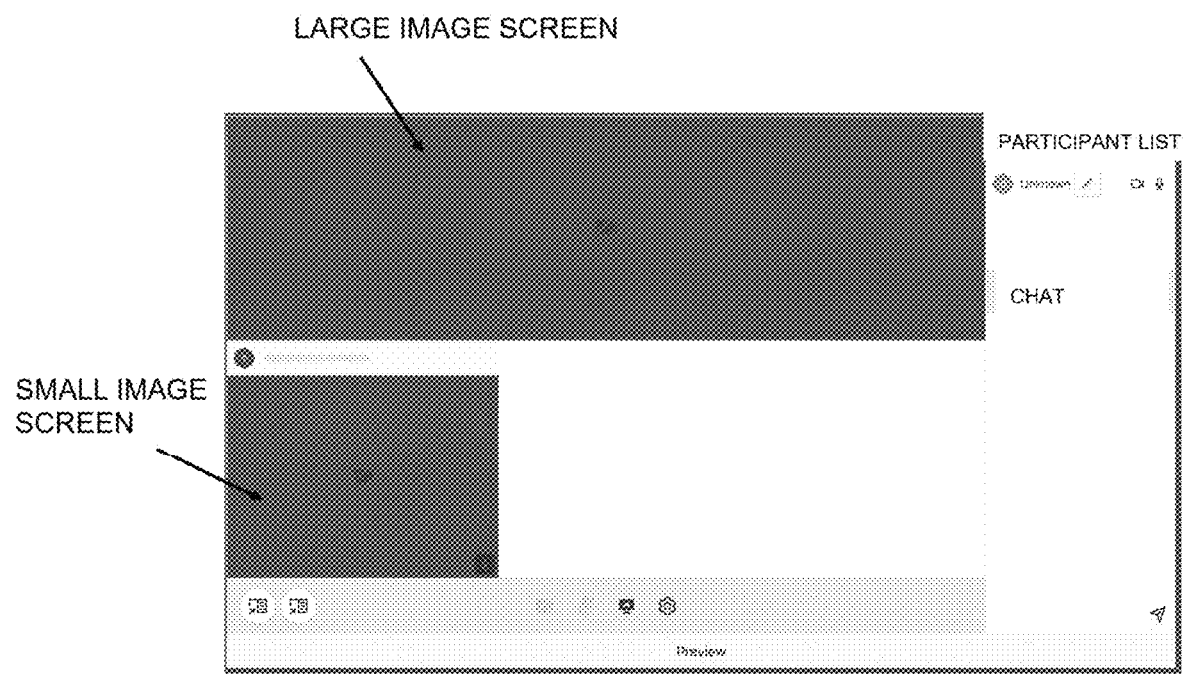

Referring FIG. 3B, only image screens are used, and a layout including a large image screen at a top and a small image screen at a bottom may be displayed.

Figure 3C:
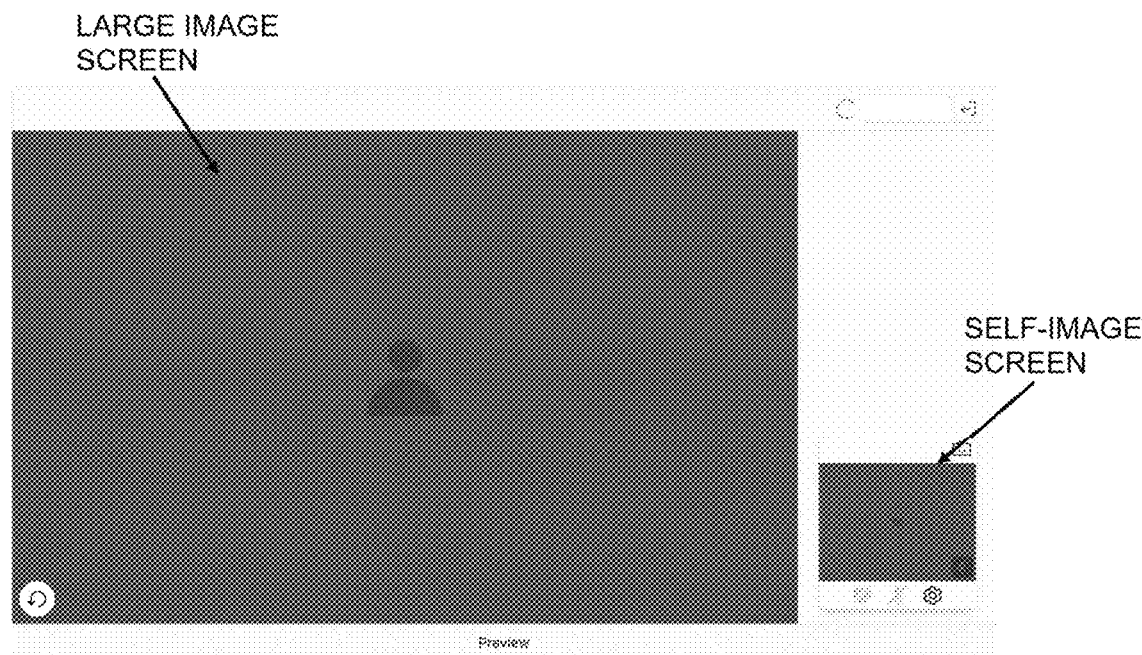

Referring to FIG. 3C, only image screens are used, and a layout including a large image screen at a left side and a self-image screen at a right side may be displayed.

Figure 3D:
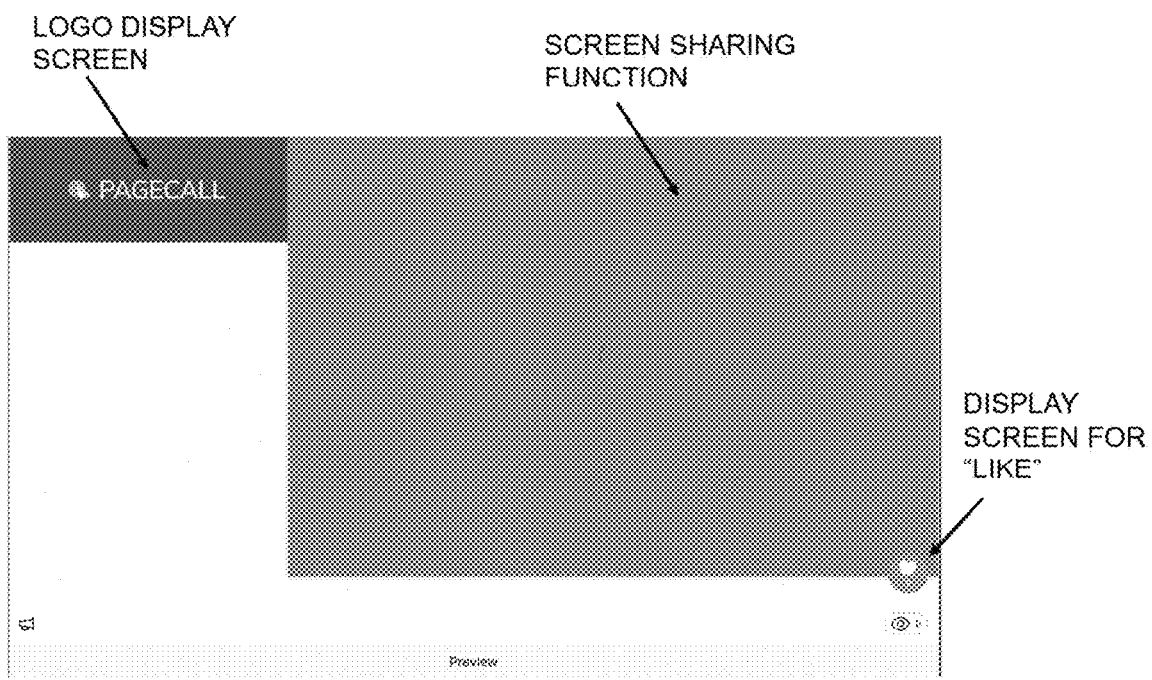

Referring to FIG. 3D, a layout including a logo display screen indicating a service provider at an upper left side, and a screen sharing function and a display screen for "Like" at a right side may be displayed.

Figure 3E:
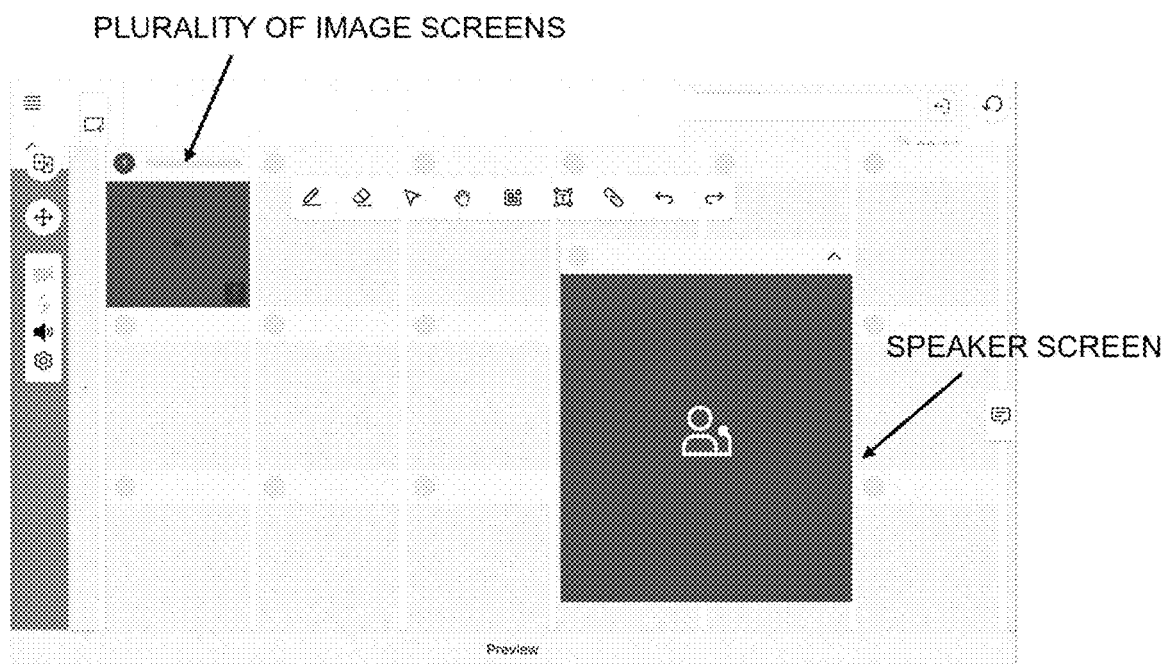

Referring to FIG. 3E, a layout including a plurality of image screens and a speaker screen when a plurality of participants participate may be displayed.

As described in the above embodiments, while a service provider operates business, for example, a layout specialized for a whiteboard function may be required when notes of users are important, such as video education, a layout emphasizing an image screen may be required when a video image is more important, and a layout specialized for a plurality of image screens and a speaker screen may be required during a video conference or web seminar with a plurality of participants and a speaker.

Such layouts of the room template may be defined to be optimized according to a nature of a room and a role type of a user, and may be modified and edited by an administrator by using a room template management console.

FIG. 4 illustrates an example for describing a room template provided according to a role type of each user, in a video class environment, according to an embodiment of the disclosure.

Referring to FIG. 4, when a room template suitable to a 1:1 or 1:n video class environment is defined, role types of users may be classified into three, i.e., a student, a teacher, and an observer. Each role may be defined by a combination of a corresponding layout and a corresponding option.

First, in case of a role type "student", a layout in a format suitable to a student may be defined such that a camera image and whiteboard of a teacher are displayed large. For the student, when a camera is not required to be used, a camera function-related option may be defined such that the camera is not used.

Then, in case of a role type "teacher", a layout optimized to provide lecture materials is defined. For the teacher, control authority of, for example, level 2, is assigned so as to assign control authority different from other participants, thereby defining an authority-related option to control a microphone, canvas manipulation authority, or the like of the student.

Lastly, in case of a role type "observer", a layout with a minimized function-related portion is defined because the observer does not participate in a class. For example, for the observer, such as a parent, a hidden attribute-related option enabling the observer to be hidden from other participants may be defined when the observer observes secretly without being shown to other participants.

As such, by using the room template of the disclosure, pieces of optimized layout and option information are differently provided according to role types of participants in a specific environment, such as a video class environment, thereby guaranteeing serviceability with high immersiveness.

Figure 5:
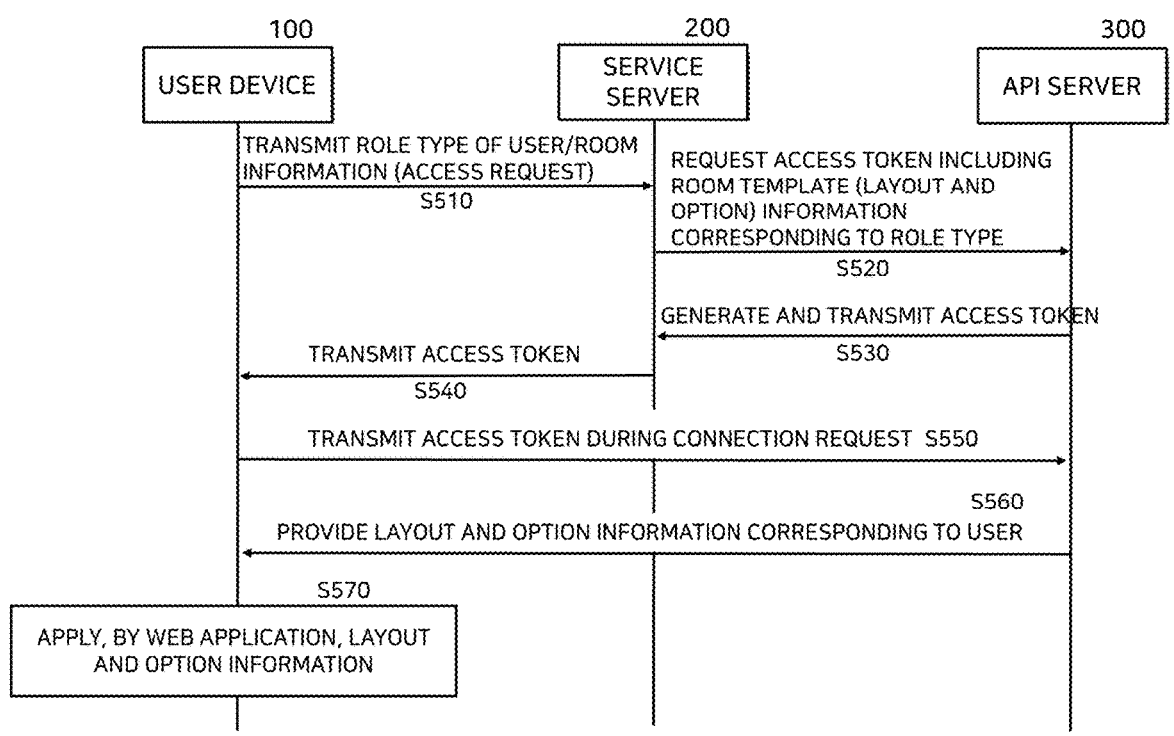
FIG. 5 is a flowchart for describing a method and system for providing a customized user experience (UX)/user interface (UI) for each user type during a runtime of a web application by using a room template, according to an embodiment of the disclosure.

FIG. 5 is a flowchart for describing a method and system for providing a customized UX/UI for each user type during a runtime of a web application by using a room template, according to an embodiment of the disclosure.

A user device 100 is a device used by a customer using a service, and may be any one of a smart phone, a tablet computer, a desktop computer, a laptop computer, a notebook computer, a workstation, a personal digital assistant (PDA), a portable computer, a wireless phone, a mobile phone, an e-book, a portable multi media player (PMP), a portable game device, a digital camera, a television, a wearable device, and a vehicle, but is not limited thereto.

A service server 200 is a server operated and managed by a service provider who directly operates business by providing a service to a customer, and an API server 300 is a server operated and managed by a development company that develops and provides a web application for the service provider, and for example, the development company may provide remote communication software, such as a video education solution or a video conference solution, to the service provider via the API server 300.

Referring to a method of dynamically providing a room template during a runtime of an API-based application, according to an embodiment of the disclosure, first, the user device 100 may request the service server 200 for a service access while transmitting user authentication information for user authentication and transmitting information about a room to be entered and a role type of a user (operation S510). Here, when the user device 100 selects a room to be entered, a plurality of role types corresponding to the selected room are provided, and the user selects one of the provided plurality of role types. Then, selection information on the role type of the user may be transmitted to the service server 200.

The service server 200 may request the API server 300 to generate an access token including room template information including layout and option information corresponding to the role type of the user (operation S520). The API server 300 requires a mechanism for authenticating and authorizing a client user and may realize efficient access authority management via token-based authentication. The service server 200 may transmit, to the API server 300, role type identification information matching the user of the user device 100 while requesting the access token, such that the access token generated by the API server 300 includes room template identification information corresponding to the role type of the user.

Here, the generated and issued access token includes layout and option identification information (the room template identification information) matching the user, and the access token may be, for example, a Jason Web Token (JWT) in a JSON format or may be in any one of various formats. The access token may be encoded by using a symmetric key via a hash-based message authentication code (HMAC) algorithm, by using an asymmetric key via a Rivest, Shamir, and Adelman (RSA) algorithm or elliptic curve digital signature algorithm (ECDSA), or via any other method. An encoding method is not limited to a specific method.

Then, the API server 300 generates and issues the access token and transmits the access token to the service server 200 (operation S530), the access token is transmitted to the user device 100 via the service server 200 (operation S540), and the user device 100 stores the access token at a client side.

The user device 100 may request a connection to a room access of a corresponding web application while transmitting the access token received from the service server 200 to the API server 300 (operation S550). Here, the API server 300 may invoke, from an own DB, layout and option information corresponding to the role type related to the room to be entered by the user, and provide the layout and option information corresponding to the user to the user device 100 (operation S560).

The room template information provided according to the role type of the user of the user device 100 is determined based on the layout and option information corresponding to the role type of the user and a type of a room configured by an administrator of a service provider via a room template management console, and thus the layout and option information pre-configured according to the role type of each user may be dynamically generated and provided.

A web application of the user device 100 may provide a customized UX/UI by applying the layout and option information corresponding to the user, based on the layout and option information received from the API server 300 (operation S570).

As such, the web application parses layout and option data from the DB stored in the API server 300 during a runtime and applies the parsed layout and option data to provide the UX/UI, thereby dynamically providing the room template corresponding to the role type of the user of the user device 100.

According to the disclosure, a method and system for dynamically providing a room template during a runtime of a web application may be provided for a service providing company to provide and manage operation methods and layouts optimized to role types of users participating in a room.

Also, according to the disclosure, a user experience (UX)/user interface (UI) optimized to a role type of each user may be provided by defining a room template related to an option and a layout of a room space where users communicate with each other, according to a room environment and a role type of a user.

Also, according to the disclosure, a UX/UI corresponding to a role of each user and a nature of a room in which users participate may be provided in a remote communication environment, thereby enhancing immersiveness and functionality through provision of an environment customized to a type of each user.

Also, according to the disclosure, a room template management console enabling a service providing company or user to conveniently generate, modify, add, or update a room template in an easy way to correct may be provided, thereby enhancing convenience of a user and administrator.

Also, according to the disclosure, a UX/UI may be provided by parsing layout and option information data from a web application during a runtime, thereby increasing a range of UX/UI modification according to a role type of a user in one application.

The effects of the disclosure are not limited to those mentioned above, and other effects that are not mentioned may be clearly understood by one of ordinary skill in the art from the detailed description.

While a method and system according to embodiments of the disclosure have been described with reference to various specific embodiments, these are only examples and the disclosure is not limited thereto. The disclosure should be construed as having a widest range in accordance with the basic idea disclosed herein. One of ordinary skill in the art may combine or substitute the disclosed embodiments to execute a pattern of a shape that is not specified, without departing from the scope of the disclosure. In addition, one of ordinary skill in the art may easily change or modify the embodiments based on the present specification, and it is obvious that such a change or modification are within the scope of the disclosure.

What is claimed is:

1. A method of providing a user-customized user experience (UX)/user interface (UI) during a runtime of a web application by using a room template, the method comprising:

transmitting, from a user device to a service server, a room entrance-related access request;

requesting, by the service server, an application programming interface (API) server to generate an access token including room template information;

transmitting the access token generated by the API server to the user device via the service server;

transmitting, by the user device, the access token to the API server; and providing, by the API server, a UX/UI to the user device based on the room template information, wherein:

the room template information is defined by a combination of layout information and option information, the layout information and option information are determined according to a role type of a user of the user device, the option information includes information related to authority, an attribute, a function, and a language of the user, the information related to the authority of the user from among the option information relates to assigning a level of control authority related to function restriction or forced exit of another participant who entered a room, and the information related to the attribute of the user from among the option information relates to setting openness to the other participant who entered the room;

the transmitting of the room entrance-related access request includes transmitting, to the service server, the role type of the user and information about the room to enter, wherein the room template information corresponds to the role type of the user of the user device; and the role type of the user is selected from among a plurality of role types corresponding to the room to enter, the method further comprising:

designating, by an administrator related to the service server, the plurality of role types corresponding to the room by pre-defining the room template information by a management console accessible through the API server;

when entrance to the room is selected by the user device, providing the plurality of role types pre-designated according to the room, and receiving selection on one of the plurality of role types from the user device; and invoking, by the API server, layout information and option information corresponding to the selected role type, based on the access token received from the user device, and providing the invoked layout information and option information to the user device, wherein the room template information is modifiable by the administrator related to the service server by using the management console provided through the API server, and a role type designated according to the room is addible by the administrator related to the service server by using the management console.

2. The method of claim 1, wherein the role type of the user includes a student, a teacher, and an observer.

3. The method of claim 1, wherein the user device is configured to parse the room template information received from the API server during the runtime.

4. A system for providing a user-customized user experience (UX)/user interface (UI) during a runtime of a web application by using a room template, the system comprising:

a user device configured to transmit, to a service server, a room entrance-related access request; and an application programming interface (API) server configured to receive, from the service server, a request to generate an access token including room template information, and transmit the generated access token to the user device through the service server, wherein:

the API server is further configured to provide a UX/UI to the user device based on the room template information in response to receiving the access token from the user device;

the room template information is defined by a combination of layout information and option information, the layout information and option information are determined according to a role type of a user of the user device, the option information includes information related to authority, an attribute, a function, and a language of the user, the information related to the authority of the user from among the option information relates to assigning a level of control authority related to function restriction or forced exit of another participant who entered a room, and the information related to the attribute of the user from among the option information relates to setting openness to the other participant who entered the room;

during the room entrance-related access request, the role type of the user and information about the room to enter are transmitted to the service server, and the room template information corresponds to the role type of the user of the user device;

the role type of the user is selected from among a plurality of role types corresponding to the room to enter;

an administrator related to the service server designates the plurality of role types corresponding to the room by pre-defining the room template information by a management console accessible through the API server;

when entrance to the room is selected by the user device, the plurality of role types pre-designated according to the room are provided and selection on one of the plurality of role types is received from the user device;

the API server is further configured to invoke layout information and option information corresponding to the selected role type, based on the access token received from the user device, and provide the invoked layout information and option information to the user device; and the room template information is modifiable by the administrator related to the service server by using the management console provided through the API server, and a role type designated according to the room is addible by the management console.

5. The system of claim 4, wherein the role type of the user includes a student, a teacher, and an observer.

6. The system of claim 4, wherein the user device is configured to parse the room template information received from the API server during the runtime.

\* \* \* \* \*